Figure 1:
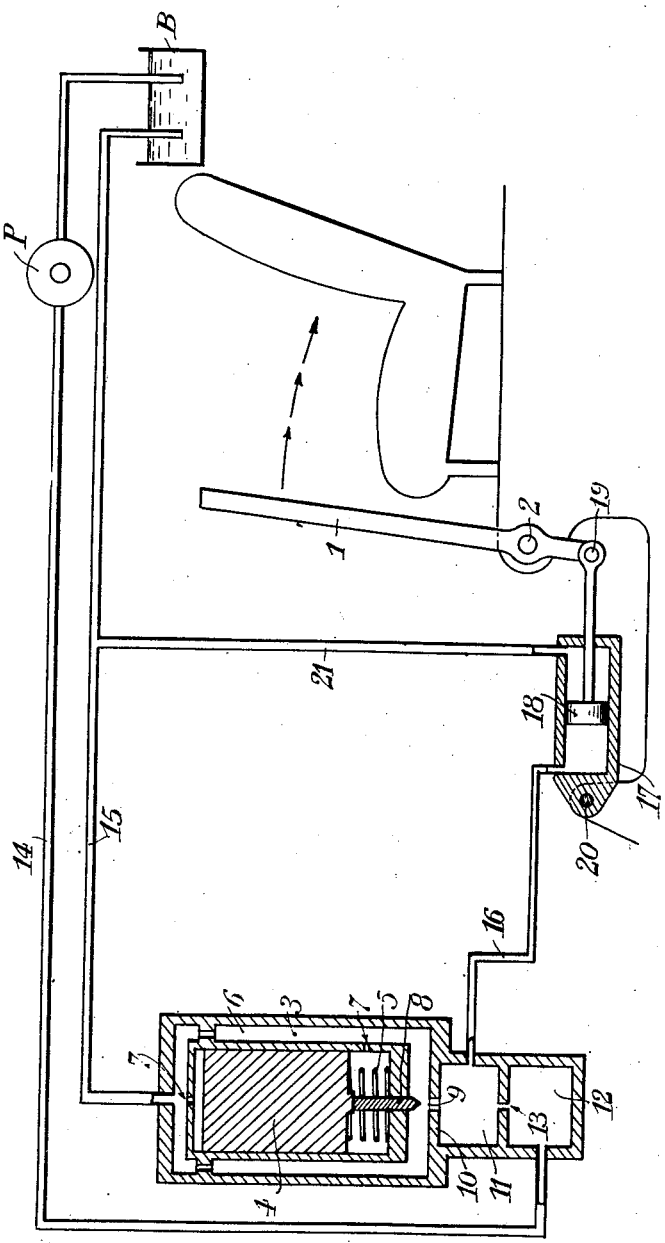

Oct. 23, 1956   R. LUCIEN   2,767,942
APPARATUS LIMITING ACCELERATION FORCES ON AIRCRAFT
Filed Dec. 7, 1953   3 Sheets-Sheet 1

Oct. 23, 1956 R. LUCIEN 2,767,942
APPARATUS LIMITING ACCELERATION FORCES ON AIRCRAFT
Filed Dec. 7, 1953 3 Sheets-Sheet 2

Oct. 23, 1956   R. LUCIEN   2,767,942
APPARATUS LIMITING ACCELERATION FORCES ON AIRCRAFT
Filed Dec. 7, 1953   3 Sheets-Sheet 3
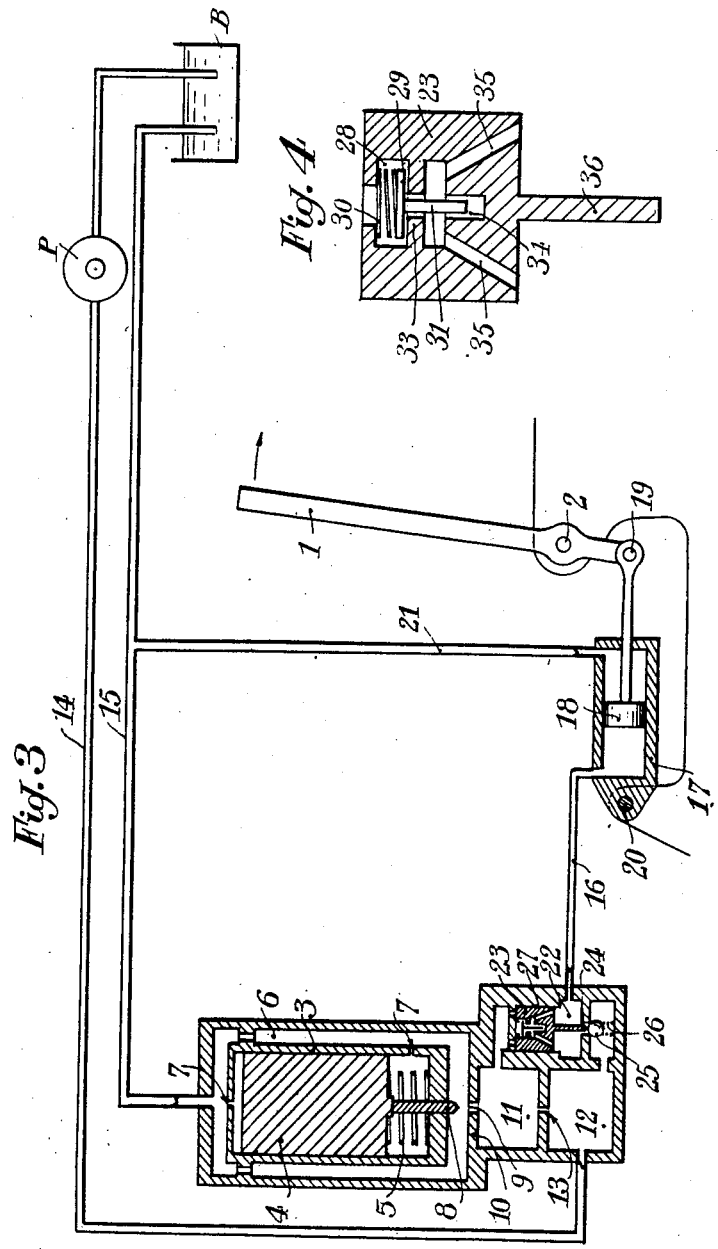

United States Patent Office 2,767,942
Patented Oct. 23, 1956

2,767,942

APPARATUS LIMITING ACCELERATION FORCES ON AIRCRAFT

Rene Lucien, Paris, France, assignor to Societe d'Inventions Aeronautiques et Mecaniques S. I. A. M., Fribourg, Switzerland, a Societe Anonyme of Switzerland Application December 7, 1953, Serial No. 396,547

Claims priority, application France August 14, 1953

4 Claims. (Cl. 244—83)

This invention relates to improvements in apparatus for limiting the acceleration forces to which aircraft are subjected in flight.

Very high speed aircraft are regularly subjected, for example when the pilot straightens the aircraft too suddenly from a dive, to accelerations of such magnitude that they cause physiological troubles. These occurrences are all the more to be feared because modern aircraft are now furnished with servo-mechanisms which have for their object to reduce the effort required on the part of the pilot in such manoeuvres, and which reduce the feel of the operating element with respect to resistance to movement on the part of the flight control member which it actuates.

The present invention relates to an automatic acceleration-limiting device, which can be fitted to one or other of the control members in order, by reacting on the operating element, to warn the pilot, when his aircraft is on the point of attaining a critical acceleration, or even to hinder it being attained.

At the moment when the critical acceleration is on the point of being reached, this device produces on the operating element a limiting action tending to displace it automatically in the reverse direction to that which has produced the said acceleration.

A further feature of the invention is to produce an apparatus in which the reactive force on the operating element is furnished by a fluid under pressure of which the delivery and the pressure, at the inlet of the apparatus, may be variable within certain limits without disturbing the functioning of the system.

In principle, the invention is characterised by the fact that, at the moment when the critical acceleration is about to be attained, the limiting action on the said operating element is brought about by the increase of pressure in a chamber, interposed in a main pressure circuit, which is in hydraulic connection with the operating element and receives the fluid through a calibrated orifice of which the cross-sectional area of flow is much reduced compared with that of the circuit.

In a manner known in itself, the said increase of pressure results from the closing of a return-conduit of the main circuit under the effect of the inertia of a mass which is movable with respect to the aircraft.

In one simple embodiment, the said chamber is connected directly to a hydraulic limiting cylinder associated with the operating element.

In another embodiment, there is provided in parallel with the said chamber which is then the main chamber, an auxiliary chamber with a piston movable therein which, under the effect of the increase of pressure produced in the main chamber, opens a valve which thus puts the main pressure circuit, and a hydraulic limiting cylinder associated with the operating element, in direct communication without the intervention of the calibrated orifice.

The invention is illustrated in the attached drawings in its application to the elevator, i. e. the flight control member which regulates the rise and fall of the aircraft and consequently it has here for its object the limitation of accelerations in the plane of symmetry of the aircraft, but it will be understood that, within the scope of the invention, the same limiting devices could be applied to any other controls, whether for direction, turning, control of wing flaps or otherwise.

Figure 2:
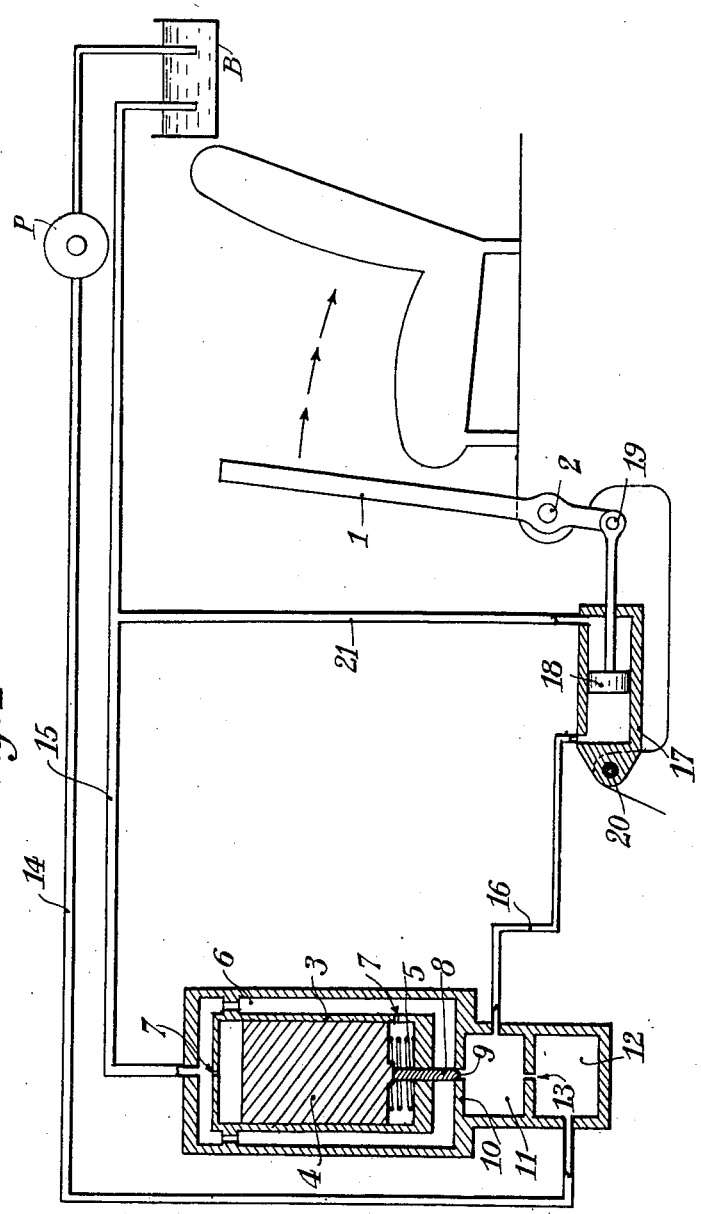

In the accompanying drawings:

Figure 1 shows in longitudinal section one embodiment of a device according to the invention, in its inactive position, Figure 2 is a corresponding view showing the parts in the active position, Figure 3, shows a modification in an inactive position, Figure 4 shows to a larger scale a detail of the apparatus of Figure 3.

In these figures similar parts carry the same reference numbers.

With reference to Figures 1 and 2, the normal operating element or control lever 1, for elevation, is pivoted about an axis 2 and is connected to the horizontal control member or elevator by transmission means which are not shown in the drawing. The device for limiting acceleration comprises a chamber 3 in which a weight 4 can slide, urged upwardly by a spring 5. The chamber is enclosed in an outer chamber 6 with which it is in communication by the orifices 7—7 situated on one side and the other of the weight 4.

The chamber 3 has a needle-valve 8 which passes freely through its wall and has a seating on the edge of a corresponding opening 9 formed in the base 10 of the chamber 6. This opening affords communication between the chamber 6 and a chamber 11, which itself communicates with a chamber 12 by means of a restricted orifice 13. The chamber 11 defined between the restricted inlet orifice 13 and the opening 9 controlled by the valve 8 is considered a regulating chamber. The cross-section of flow of both the restricted orifice 13 and the opening or orifice 9 is less than the minimum cross-section of the hydraulic circuit both upstream and downstream of the regulating chamber 11. In normal operating conditions, the orifice 9 remains open and its cross-section is greater than that of the orifice 13. Consequently, there is a fall of pressure head at the orifice 13 and the fluid in the regulating chamber 11 is at the low pressure of the sump B. When the needle valve 8 partly or completely closes the orifice 9, its cross-section becomes zero or at all events much less than that of the orifice 13, so that the pressure in the regulating chamber 11 is equal to the high pressure supplied by the pump P. The chamber 12 is in communication by means of a high pressure conduit 14 with the delivery side of the pump P and the chamber 3 with an exhaust tank B by the low pressure conduit 15. The regulating chamber 11 is in communication by a conduit 16 with the back-end of a cylinder 17 in which is a movable piston 18 of which the piston-head is connected at one end 19 to the lever 1, the cylinder 17 being itself pivoted about an axis 20. A conduit 21 connects the exhaust pipe 15 to the forward end of the cylinder 17.

The operation of the device is as follows: the aircraft being assumed to be flying in a straight line and the pump P operative, the force of the spring 5 is sufficient to maintain the weight 4 in the upper position (Figure 1); fluid under pressure fills the chambers 12 and 11, and (lifting valve 8) has filled the chamber 6 through the orifice 9, and the space below the weight 4 in the chamber 3 through the lower orifice 7. A continuous flow of fluid returns to the tank B through the pipe 15. The two faces of the piston 18, both being in communication with the low pressure line, are substantially at the same pressure and the pilot has complete liberty of action over the lever 1.

During any period of strong acceleration, on the contrary, for example when at the end of a dive the pilot pulls on the lever 1, by reason of inertia the weight 4 exerts a thrust in the chamber 3, compressing the spring 5 and lowering the valve 8 on to its seat (Figure 2). The orifice 9 being thus closed, the pressure of the fluid is exerted through the high pressure conduit 14, the chamber 12, the orifice 13 and the conduit 16 on the left hand face of the piston 18 and tends to urge the lever 1 back again, contrary to the movement which the pilot is seeking to carry out. The movement is therefore resisted because the critical acceleration has been reached. The lever 1 can then be released or pushed forward until the acceleration is reduced to normal. The valve 8 rises again putting the conduit 16 in connection with the low pressure line and so giving the pilot again complete liberty of movement in respect of the lever 1.

The weight 4 and the spring 5 are conveniently so determined that the pressure transmitted by the piston 18 to the lever 1 is sufficiently felt by the pilot for the value of the acceleration to be considered by him as critical.

The orifice 7 is chosen sufficiently small to create such a resistance to the passage of the fluid as will prevent untimely operation of the system under the effect of accelerations of very short duration such as those which might result from eddies due to atmospheric conditions.

The restricted orifice 13, which is placed in series with the conduit 16, plays an essential role, for it permits the system to be practically unresponsive to variations of pressure or of delivery in the feed conduit for pressure fluid, so that it is possible to branch these out of the general pressure fluid circuit of the aircraft without prejudicing the normal functioning of the acceleration limiting device.

It can be seen however, that the restricted orifice 13 must be of a size sufficient to permit rapid action of the fluid on the piston 18 and the lever 1. It follows that substantial delivery is demanded from the pump P.

The apparatus of Figure 3 remedies this disadvantage. In this embodiment, the conduit 16, instead of being connected to the chamber 11, is connected to a chamber 22 which communicates, on the one hand, with the regulating chamber 11 through a piston-valve 23 and, on the other hand, with the chamber 12 through an orifice 24 furnished with a ball-valve 25, held up by a spring 26. The piston 23 which moves in a cylinder 27 comprises, as shown in Figure 4, a valve chamber 28, a valve 29 and a spring 30 tending to close the valve on its seat (Figure 3). The valve 29 carries a valve-stem 31 which passes through a chamber 32 and is guided by a flange 33 and by the walls of a recess 34. Into the chamber 32 there open passages 35 which put it in communication with the chamber 22. The piston 23 carries a stem 36 to engage the ball-valve 25.

When the aircraft flies without acceleration (Figure 3), the pressure in the chamber 12 adjusts itself to that of the spring 26 holding the ball 25 on its seat, so that the pressure which prevails in the regulating chamber 11 is insufficient to cause the piston 23 to descend; the valve 29 rests on its seat, the pressure is low on the two faces of the piston 18 and the pilot has thus complete liberty of movement of lever 1 in both directions. When he pulls on the lever 1, the fluid urged by the piston 18 toward the chamber 22 lifts the valve 29 and returns to the tank B through the chamber 11. However, as soon as the acceleration passes the critical limit, the orifice 9 is closed as already indicated. The pressure rises in the chamber 11 and causes the piston 23 to descend whereupon the stem 36 is applied to the ball-valve 25 compressing the spring 26. A direct passage is thus established between the chamber 12 and the conduit 16, connecting the high pressure line and the pump to the left-hand face of the piston 18. The lever 1 is thus urged forward, informing the pilot that the acceleration has become critical and moving itself toward the position tending to return to a normal value.

It is to be understood that in this embodiment the action on the lever 1 can be very rapid because it is exerted from the chamber 12 by the orifice 24 of large section. The diameter of the restricted orifice 13 not having any influence on this action may therefore be smaller than in the previous case, which permits an economy in the pump delivery.

The flow of pressure fluid might be taken from the general feed conduit of other apparatus on board. It is to be remarked that the relief of gas which may be included in the liquid effects itself automatically, due to the fact that it is circulated from below upwardly in this apparatus.

The word "acceleration" is used in this specification in its broad scientific sense as including a negative acceleration, i. e. a deceleration.

I claim:

1. An acceleration-limiting device for aircraft, exercising a limiting action on a pilot-actuated operating element for a control member of the aircraft, said device comprising: a cylinder and movable piston assembly; means connecting the piston to the operating element; a fluid-pressure circuit having a high pressure line and a low pressure line; a regulating chamber interposed in said circuit between said lines; a conduit connecting the regulating chamber to one end of the cylinder; a conduit connecting the other end of the cylinder to the low pressure line; a restricted fluid inlet orifice between the high pressure line and the regulating chamber; a fluid outlet orifice at the low pressure side of the regulating chamber of larger cross-sectional area than the inlet orifice; and means for at least partly closing the outlet orifice with increasing acceleration of the aircraft at a predetermined critical value.

2. A device according to claim 1 in which the means for producing in the said regulating chamber an increase of pressure is constituted by a weight movable in relation to the aircraft, which is caused by its inertia to close an exhaust conduit from the fluid pressure circuit as soon as the acceleration of the aircraft attains the said critical value.

3. An acceleration-limiting device for aircraft, exercising a limiting action on a pilot-actuated operating element for a control member of the aircraft, comprising: a fluid-pressure circuit; a regulating-chamber interposed in said circuit; means for producing an increase of pressure in the said regulating-chamber with increasing acceleration of the aircraft at a critical predetermined value; a hydraulic connection interposed between the said regulating chamber and the said operating element, such that the said increase of pressure tends to return the operating element in the direction contrary to that which has brought about the increase of acceleration; an orifice of which the section is restricted in relation to that of the fluid-pressure circuit, for the admission of fluid to said regulating chamber; an auxiliary chamber interposed in the said hydraulic connection in series with the regulating chamber; a spring-closed valve between the auxiliary chamber and the fluid-pressure circuit on the supply side of the restricted orifice; and a movable piston in the auxiliary chamber adapted to open said spring-closed valve in response to increase of pressure in the regulating chamber.

4. An acceleration-limiting device for aircraft, exercising a limiting action on a pilot-actuated operating element for a control member of the aircraft, comprising: a fluid-pressure circuit; a regulating-chamber interposed in said circuit; means for producing an increase of pressure in the said regulating-chamber with increasing acceleration of the aircraft at a critical predetermined value; a hydraulic connection interposed between the said regulating chamber and the said operating element, such that the said increase of pressure tends to return the operating element in the direction contrary to that which has brought about the increase of acceleration; an orifice of which the section is restricted in relation to that of the fluid-pressure circuit, for the admission of fluid to said regulating chamber; an auxiliary chamber interposed in the said hydraulic connection in series with the regulating chamber; a spring-closed valve between the auxiliary chamber and the fluid-pressure circuit on the supply side of the restricted orifice; a movable piston in the auxiliary chamber adapted to open said spring-closed valve in response to increase of pressure in the regulating chamber; a valve chamber within the said piston; at least one communicating passage between the two faces of the said piston; and an auxiliary valve co-opearting with said passage to permit and to hinder respectively the passage of fluid between one face and the other of the said piston.

References Cited in the file of this patent

UNITED STATES PATENTS

| | | |
|---|---|---|
| 2,222,886 | Voigt | Nov. 26, 1940 |
| 2,548,481 | Knowler et al. | Apr. 10, 1951 |
| 2,630,284 | Feeney | Mar. 3, 1953 |

FOREIGN PATENTS

| | | |
|---|---|---|
| 636,639 | Great Britain | May 3, 1950 |
| 716,427 | Great Britain | Oct. 6, 1954 |
| 838,413 | France | Dec. 7, 1938 |
| 862,649 | France | Dec. 16, 1940 |